United States Patent
Mitrowitz et al.

(10) Patent No.: US 6,682,091 B1
(45) Date of Patent: Jan. 27, 2004

(54) COVER FOR AN AIRBAG MODULE

(75) Inventors: Manfred Mitrowitz, Purbach (AT);
Peter Hofleitner, Klingenbach (AT);
Richard Hahnekamp, Eisenstadt (AT);
Manfred Bruckler, Eisenstadt (AT)

(73) Assignee: Magna EYBL GmbH, Ebergassing (AU)

( * ) Notice: Subject to any disclaimer, the term of this patent is extended or adjusted under 35 U.S.C. 154(b) by 0 days.

(21) Appl. No.: 09/958,383

(22) PCT Filed: Apr. 7, 2000

(86) PCT No.: PCT/AT00/00085

§ 371 (c)(1),
(2), (4) Date: Jan. 4, 2002

(87) PCT Pub. No.: WO00/61403

PCT Pub. Date: Oct. 19, 2000

(30) Foreign Application Priority Data

Apr. 8, 1999 (AT) .............................................. A 621/99

(51) Int. Cl.[7] ............................................... B60R 21/20
(52) U.S. Cl. ..................................... 280/728.3; 280/732
(58) Field of Search .............................. 280/728.3, 732, 280/731; 264/320, 255; 428/43

(56) References Cited

U.S. PATENT DOCUMENTS

| | | | | |
|---|---|---|---|---|
| 5,069,477 A | * | 12/1991 | Shiraki ..................... | 280/728.3 |
| 5,180,187 A | * | 1/1993 | Muller et al. ............ | 280/728.3 |
| 5,395,668 A | * | 3/1995 | Ito et al. ........................ | 428/43 |
| 5,698,283 A | * | 12/1997 | Yamasaki et al. ......... | 280/728.3 |
| 5,779,262 A | * | 7/1998 | Totani et al. ............. | 280/728.3 |
| 5,803,489 A | * | 9/1998 | Nusshor .................... | 280/728.3 |
| 5,947,511 A | * | 9/1999 | Usui et al. .................... | 264/255 |
| 5,957,483 A | * | 9/1999 | Miltenberger et al. ... | 280/728.3 |
| 5,957,484 A | * | 9/1999 | Levine et al. ............. | 280/728.3 |
| 6,092,835 A | * | 7/2000 | Thakore et al. .......... | 280/728.3 |
| 6,109,645 A | * | 8/2000 | Totani et al. ............. | 280/728.3 |
| 6,123,356 A | * | 9/2000 | Gray et al. ................ | 280/728.3 |
| 6,210,797 B1 | * | 4/2001 | Sato et al. ................ | 280/728.3 |
| RE37,540 E | * | 2/2002 | Iannazzi et al. ......... | 280/728.3 |
| 6,402,189 B1 | * | 6/2002 | Gray et al. ................ | 280/728.3 |
| 6,440,514 B1 | * | 8/2002 | Ueno et al. ............... | 280/728.3 |

FOREIGN PATENT DOCUMENTS

| | | | |
|---|---|---|---|
| JP | 05-131888 A | * | 5/1993 |
| JP | 06-247252 A | * | 9/1994 |

* cited by examiner

*Primary Examiner*—Paul N. Dickson
*Assistant Examiner*—Deanna Draper
(74) *Attorney, Agent, or Firm*—Bachman LaPointe, P.C.

(57) ABSTRACT

A cover for an airbag module, consisting of a plastic base structure (1) which is provided with a decorative material (2), preferably fabric, leather or imitation leather, and has at least one covering region (3), circumscribed by a predetermined breaking line (4) and a bending line (5), for the airbag. The predetermined breaking line (4) is formed by margins (6) of the base structure (1) which are open on the inside, the decorative material (2) forming a double section (8) of material closing the slot-shaped opening (7) between the margins (6) of the base structure (1)

5 Claims, 1 Drawing Sheet

COVER FOR AN AIRBAG MODULE

Figure 1:
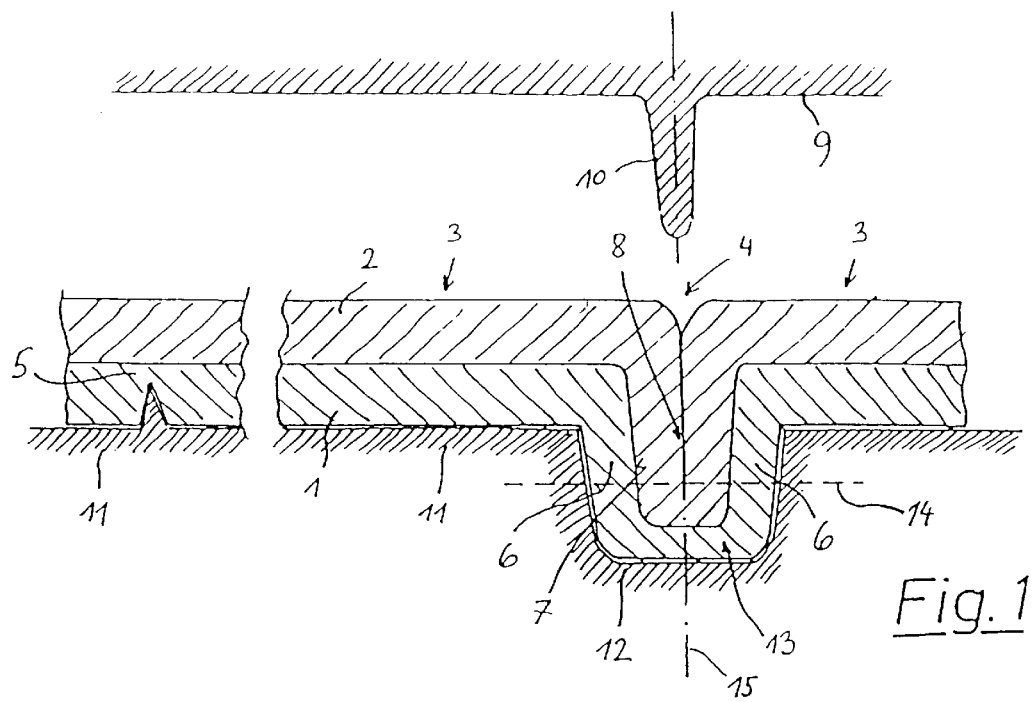

The invention relates to a cover for an airbag module, consisting of a plastic base structure which is provided with a decorative material, preferably fabric, leather or imitation leather, and has at least one covering region, circumscribed by a predetermined breaking line and a bending line, for the airbag, and to a method of producing an airbag cover.

In the covers used nowadays for airbag modules, the surface facing the vehicle interior usually consists of a decorative material which is applied to a hard, dimensionally stable base structure. Conflicting requirements arise with regard to sufficient rigidity and a reliable tear-open behavior in the event of the airbag being used. Furthermore, the airbag cover, in its external appearance, is to be capable of being integrated in the layout of the interior space of the vehicle in a harmonious manner and is to be capable of being used in the same way for covers in the region of the steering wheel, the door trim and the dashboard of a vehicle.

For example, an airbag cover which is integrated in the dashboard of the motor vehicle has been disclosed by DE 44 10 889 A1. The cover consists of a rigid foam body which is provided with metallic reinforcement and is covered with a covering film on the visible side. At a center seam, a notch in the hard foam body and a tearing seam in the covering film form a predetermined breaking point. When the airbag is activated, an initial tear forms starting approximately from the center of the center seam and spreads on both sides. When the cover is being produced, perforations have to be made in the covering film along the center seam, or a reduction in the material cross section has to be provided in another manner, in order to facilitate the tearing.

DE 196 36 428 A1 discloses an airbag cover in a dashboard, a steering-wheel-hub cover or door trim, this airbag cover having at least one predetermined breaking line. A weakness line determining the predetermined breaking line is produced by a perforation line which reaches approximately to a point below the surface visible to the vehicle occupants. In order to produce an attractive appearance, this perforation line is a curve which alternates about the predetermined breaking line and whose shape simulates the structure of the visible surface.

The object of DE 42 29 561 C1 is to produce a cover for an airbag which contains a virtually distortion-free device, which acts without any risks due to the functioning, for producing a predetermined breaking line which is easy to pierce. In a very complicated solution, it is proposed that a tearing wire running along the predetermined breaking point and provided with elements for the local destruction of the cover be embedded in the cover, this tearing wire being pulled or ripped suddenly through the cover by a pyrotechnic propellant charge and thereby creating a predetermined breaking point for the gas bag.

Finally, a cover for an airbag module having a plastic base structure has been disclosed by DE 196 53 797 A1, this cover comprising a fastening region and a covering region coated, if need be, with foamed plastic. The cover is provided with a coating of real leather or imitation leather, at least one region which can be torn open in a flap-like manner being provided in the covering region, this region being circumscribed by a predetermined breaking line, formed by material weakening, and a bending line. The base structure of the cover consists of a pot-like plastic part, whose walls pointing downward are designed as a fastening region and whose covering region is interrupted in the center and coated with foamed plastic. The foamed plastic bridges the interruption in the base structure and has a predetermined breaking line which is formed by an outer groove-like recess and an inner groove-like recess. The outer recess extends over the entire width of the cover and is dimensioned in such a way that the coating of leather or imitation leather can be folded or pressed into the recess with a double section of material being formed. According to an embodiment variant in DE 196 53 797 A1, it is also possible for the base structure not to be coated with foamed plastic and for the groove-like recess to be provided directly in the base structure. The remaining cross section in the foamed plastic or in the base structure must be torn open or broken open after the ignition of the airbag, as must the coating, which is separately cut to size and is advantageously provided with perforations in the region of the predetermined breaking line.

The object of the present invention is to develop a cover for an airbag of the type mentioned at the beginning in such a way that this cover offers as little resistance as possible to the emerging airbag and at the same time the production of the cover is substantially simplified. Furthermore, the visual appearance of the outside of the airbag is to meet the stringent requirements imposed and is to permit the use of different decorative materials.

This object is achieved according to the invention in that the predetermined breaking line is formed by open margins of the base structure, the decorative material forming a double section of material closing the slot-shaped opening between the margins of the base structure.

In a preferred embodiment of the invention, the margins of the base structure are bent in the direction of the airbag module.

Furthermore, provision is made according to the invention for the decorative material to be cut open and/or perforated along the predetermined breaking line.

In an advantageous manner, in the case of the cover according to the invention, only an exceptionally small resistance is offered to the unfolding airbag, since the cover already has a slot-shaped opening in the region of the predetermined breaking line, and this slot-shaped opening is closed in a dust-tight manner by the double section of the decorative material clamped therein before the ignition of the airbag.

According to the invention, the cover can be formed in a pressing tool in one operation, a V-shaped or U-shaped deformation being formed in the base structure by a groove which is formed in a part of the pressing tool and interacts with a fin provided in the other tool part, the decorative material being pressed into the V-shaped or U-shaped deformation with a double section of material being formed, and the end region of the V-shaped or U-shaped deformation then being cut off and/or being cut open and/or perforated in extension of the parting surface between the double section of material.

Alternatively, the base structure, according to the invention, can be produced as an injection molding, a slot or gap either being formed at the same time or being made subsequently, the decorative material being mounted on the base structure and being pressed into the gap by means of a fin or the like with a double section of material being formed, decorative material then being cut off in the region of the gap and being folded if need be.

Furthermore, according to the invention, in both methods, a bending line which adjoins the predetermined breaking line and is in the form of material weakening can be formed in the base structure in the same operation.

Figure 2:
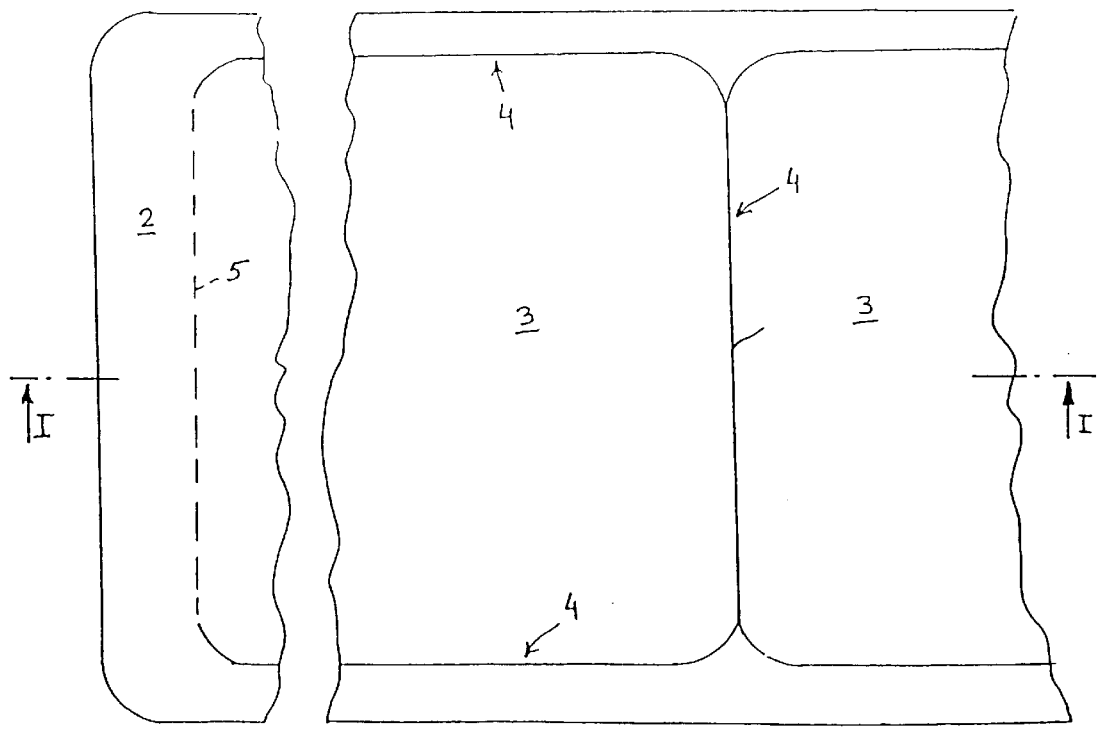

The invention is explained in more detail below with reference to drawings, in which:

FIG. 1 shows the cover according to the invention for an airbag module in a sectional representation along line I—I in FIG. 2, with schematically shown pressing tool, and FIG. 2 shows a plan view of the cover according to the invention.

The airbag cover shown in FIG. 1 consists of a plastic base structure 1 which is provided with a decorative material 2, preferably fabric, leather or imitation leather. As shown in FIG. 2, two covering regions 3, for example, are formed, and these covering regions 3 are circumscribed by a central or H-shaped predetermined breaking line 4 and adjoining bending lines 5.

The predetermined breaking line 4 is formed by margins 6 of the base structure 1 which are bent in the direction of the airbag module and are open on the inside, the decorative material 2 forming a double section 8 of material closing a slot-shaped opening 7 between the margins 6 of the base structure 1.

As shown in FIG. 1, the bottom part 11 of the pressing tool, for example, may have a groove 12 which interacts with a fin 10 of the top part 9 ,of the tool and by means of which a V-shaped or U-shaped deformation 13 is formed in the base structure 1 and in the decorative material 2. In the process, the decorative material 2, with a double section 8 of material being formed, is pressed into the V-shaped or U-shaped deformation 13. After the cover has been shaped, the end region of the V-shaped or U-shaped deformation 13 is cut off along the cutting line 14.

As an alternative to or in addition to the cutting-off, a perpendicular cut may be made along the cutting line 15. This cut may be made with a blade or by means of a laser, it also being possible for perforations to be made, in particular when using a laser.

In such a way, the cover can be produced essentially in one operation in a pressing tool, it merely being necessary to cut off , the V-shaped or U-shaped deformation 13 in a further operation. A visually attractive surface can be created, since only a notch in the decorative material 2 comparable to a seam can be seen from the passenger side. In addition, the decorative material does not have to be cut to size separately and be provided with material weakness or perforations. Furthermore, only slight changes to the automated production in the pressing tool are necessary.

The fin 10 used for the shaping of the V-shaped or U-shaped deformation 13 typically has a width of 1.5 mm and a height of 10 mm.

The cover may also be produced in such a way that the base structure is formed as an injection molding with a slot or gap running along the predetermined breaking line. However, the slot or gap may also be made subsequently on the finished base structure. The decorative material can then be mounted in place in a further operation in a conventional manner. The decorative material is pushed via a fin or the like into the gap with a double section of material being formed. Projecting lengths of the decorative material can be cut off from the underside. Furthermore, the end regions of the decorative material may in each case be folded outward.

What is claimed is:

1. A method of producing a cover for an airbag module, consisting of a plastic base structure provided with a decorative material, wherein a V-shaped or U-shaped deformation is formed in the base structure by a groove which is formed in a part of a pressing tool and interacts with a fin provided in the other tool part, wherein the decorative material is pressed into the V-shaped or U-shaped deformation with a double section of material being formed, and wherein an end region of the V-shaped or U-shaped deformation is then cut off and/or is cut open and/or perforated in extension of a parting surface between the double section of material.

2. The method as claimed in claim 1, wherein bending lines which adjoin the predetermined breaking line and are in the form of material weakening are formed in the base structure in the same operation.

3. A cover as claimed in claim 1, wherein the decorative material is selected from the group consisting of fabric, leather and imitation leather.

4. The method of producing a cover for an airbag module, consisting of a plastic base structure provided with a decorative material, wherein the base structure is produced as an injection molding, a slot or gap either being formed at the same time or being made subsequently, the decorative material being mounted on the base structure and being pressed into the gap by means of a fin with a double section of material being formed, decorative material then being cut off in a region of the gap and being folded if need be.

5. A cover as claimed in claim 4, wherein the decorative material is selected from the group consisting of fabric, leather and imitation leather.

\* \* \* \* \*